United States Patent
Wylie

(10) Patent No.: US 12,535,139 B2
(45) Date of Patent: Jan. 27, 2026

(54) CONTAMINANT EXCLUSION SEAL DESIGN

(71) Applicant: Freudenberg-NOK General Partnership, Plymouth, MI (US)

(72) Inventor: Lloyd Wylie, Cleveland, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 18/330,463

(22) Filed: Jun. 7, 2023

(65) Prior Publication Data

US 2024/0410467 A1    Dec. 12, 2024

(51) Int. Cl.
*F16J 15/32* (2016.01)
*F16J 15/3232* (2016.01)
*F16J 15/3244* (2016.01)

(52) U.S. Cl.
CPC ....... *F16J 15/3244* (2013.01); *F16J 15/3232* (2013.01)

(58) Field of Classification Search
CPC .... F16J 15/3244; F16J 15/3232; F16J 15/324; F16J 15/3252
See application file for complete search history.

(56) References Cited

U.S. PATENT DOCUMENTS

| | | | | |
|---|---|---|---|---|
| 4,906,009 A | * | 3/1990 | Saitoh | F16J 15/3232 277/424 |
| 6,619,664 B1 | * | 9/2003 | Metz | F16J 15/3244 277/400 |
| 9,033,345 B2 | * | 5/2015 | Hintenlang | F16J 15/3268 277/552 |
| 11,287,042 B2 | * | 3/2022 | Sakano | F16J 15/3256 |
| 2009/0127791 A1 | * | 5/2009 | Buro | F16J 15/3244 277/352 |
| 2013/0175763 A1 | * | 7/2013 | Berdichevsky | F16J 15/3244 277/552 |
| 2014/0225332 A1 | * | 8/2014 | Baart | F16J 15/3264 277/549 |
| 2017/0114901 A1 | * | 4/2017 | Yamanaka | F16J 15/3256 |
| 2019/0277403 A1 | * | 9/2019 | Sakano | F16J 15/3256 |

FOREIGN PATENT DOCUMENTS

WO    WO-2013081075 A1 * 6/2013 ............ F16C 33/768

* cited by examiner

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A drive-line seal system includes a housing having a bore therein. A shaft is rotatably received in the bore. A slinger is mounted to the shaft and includes a radially outwardly extending surface. An annular retainer is mounted within the bore in the housing. An annular seal body is molded to the retainer and includes a main seal lip and a dust lip extending from an inner end of the annular retainer. The annular seal body further includes an axial seal lip which engages the radially extending surface of the slinger. The axial seal lip includes a plurality of raised pumping features that engage the radially extending surface of the slinger.

6 Claims, 2 Drawing Sheets

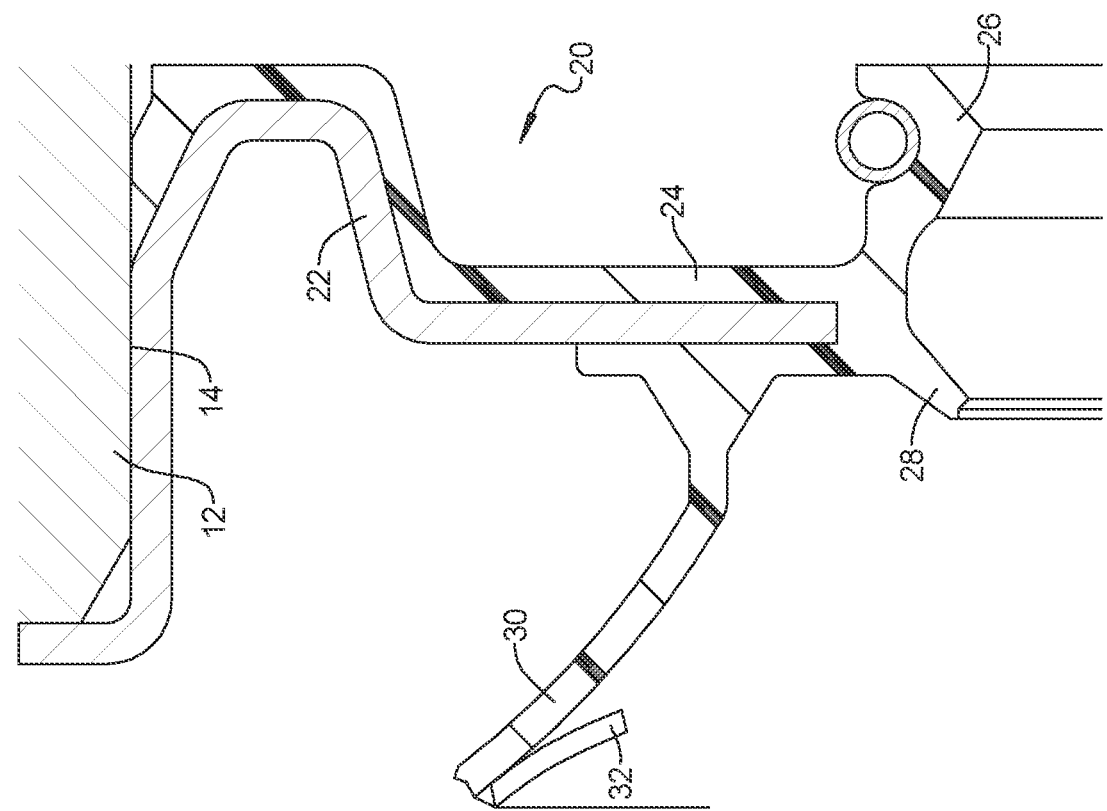
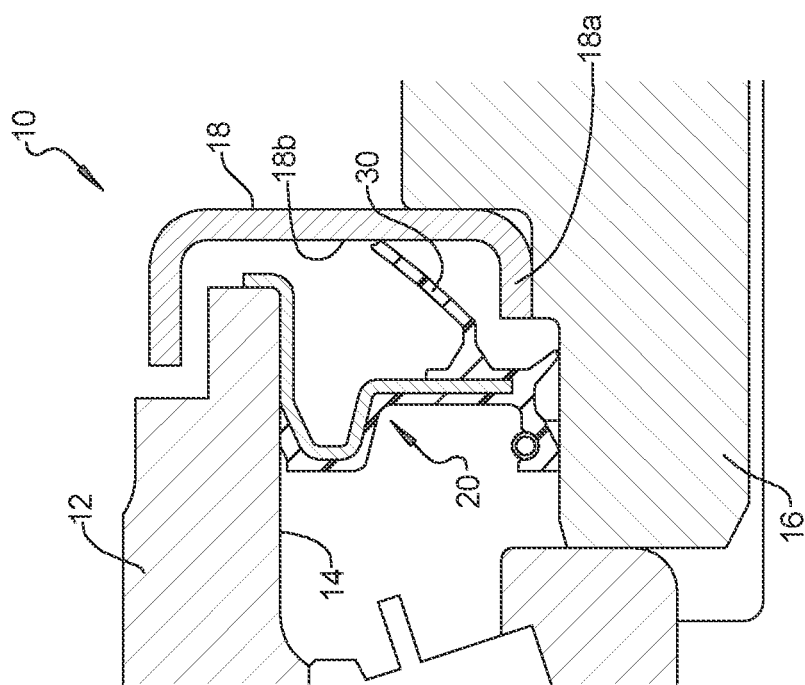

CONTAMINANT EXCLUSION SEAL DESIGN

FIELD

The present disclosure relates to a contaminant exclusion seal design.

BACKGROUND

This section provides background information related to the present disclosure which is not necessarily prior art.

A significant number of transmission and driveline seal failures have some contribution to contamination ingress. Exclusion features are meant as a measure to prevent contaminants from entering a seal. Contamination, especially with vocational vehicles, is expected as the vehicles are subjected to harsh environments and/or driving conditions. Exclusion features are in many cases not sufficient to prevent particles from entering the seal at the shaft/seal interface.

SUMMARY

This section provides a general summary of the disclosure, and is not a comprehensive disclosure of its full scope or all of its features.

The purpose is to extend seal life by increasing the exclusion capability of standard features already utilized on seals in production today.

Axial contacting lips are standard practice for exclusion in applications without endplay. The present disclosure uses a raised pumping feature such as a helix on an axial contacting lip to help pump/push particles out of the seal to extend seal life. The pumping ability of a standard helix designed as an impeller pump, when in contact with an adjacent surface, can move material present at the interface away from the seal exclusion interface. A contacting axial lip design with the ability to push material out of the seal versus material being trapped within the seal, eventually entering the shaft/seal interface, extends seal life and performance beyond current figures.

According to an aspect of the present disclosure, a drive-line seal system includes a housing having a bore therein. A shaft is rotatably received in the bore. A slinger is mounted to the shaft and includes a radially outwardly extending surface. An annular retainer is mounted within the bore in the housing. An annular seal body is molded to the retainer and includes a main seal lip and a dust lip extending from an inner end of the annular retainer. The annular seal body further includes an axial seal lip which engages the radially extending surface of the slinger. The axial seal lip includes a plurality of raised pumping features that engage the radially extending surface of the slinger.

According to a further aspect, the plurality of raised pumping features include between 4 and 12 raised helix bars.

According to a further aspect, the plurality of raised pumping features are triangular in cross section.

According to a further aspect, an edge of the axial seal lip includes a plurality of vent passages.

According to a further aspect, the main seal lip and the dust lip engage the shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a cross-section of a drive-line seal having a contacting axial lip with an exclusionary pumping feature;

FIG. 2 is a cross-sectional view of the drive-line seal shown in an assembled state;

Corresponding reference numerals indicate corresponding parts throughout the several views of the drawings.

DETAILED DESCRIPTION

Figure 4:
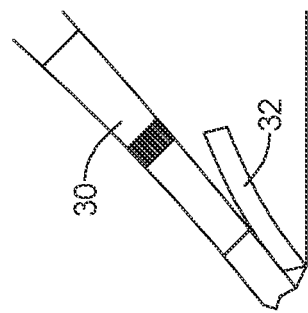
FIG. 4 is a schematic view of an example layout of the exclusionary raised pumping feature of the contacting axial lip.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With reference to FIG. 1, a drive-line seal system 10 is shown including a housing 12 having a bore 14. A shaft 16 is rotatably received in the bore 14. A slinger 18 includes a cylindrical mounting portion 18a that is mounted to the shaft 16 and includes a radially outwardly extending surface 18b. A seal member 20 is mounted within the bore 14 of the housing 12 and engages the shaft 16.

Figure 5:
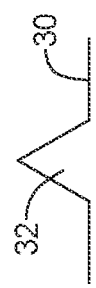
FIG. 5 is a detailed cross section of the exclusionary pumping feature.
Figure 3:
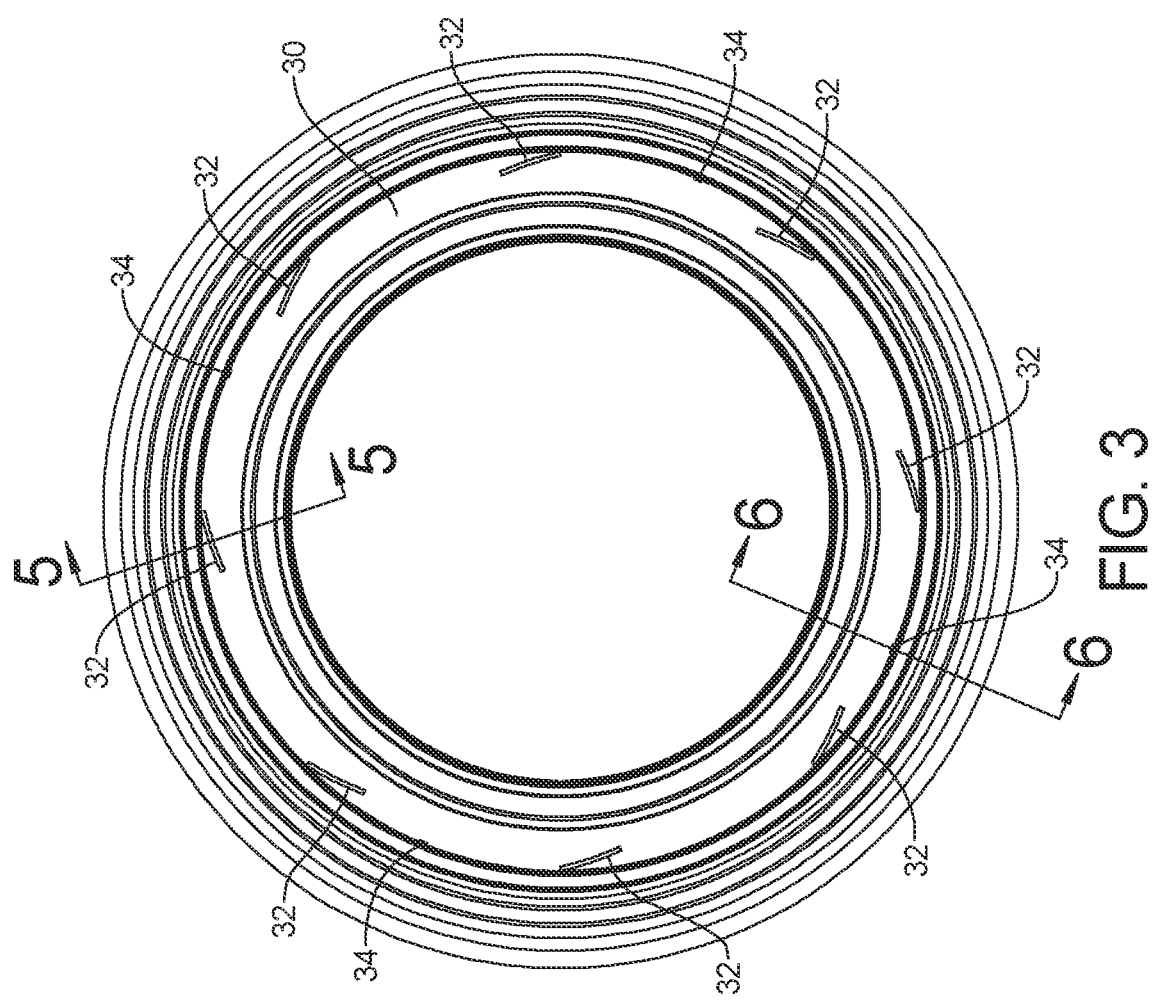
FIG. 3 is a detailed cross-sectional view of the contacting axial lip with the exclusionary pumping feature.

With reference to FIGS. 1 and 2, the seal member 20 includes an annular retainer 22 mounted within the bore 14 in the housing 12. An annular seal body 24 is molded to the retainer 22. The annular seal body 24 includes a main seal lip 26 and a dust lip 28 extending from an inner end of the annular retainer 22. The dust lip 28 is axially spaced from the main seal lip 26. In the assembled condition, the axial space between the main lip 26 and the dust lip 28 is filled with grease. The annular seal body 24 further includes an axial seal lip 30 which engages the radially extending surface 18b of the slinger 18. The axial seal lip 30 includes a plurality of raised pumping features such as helix bars 32 that engage the radially extending surface 18b of the slinger 18. The number of raised pumping features such as helix bars 32 can be between 4 and 12. As shown in FIG. 3, the number of raised pumping features 32 is preferably 8. As shown in FIG. 4, the raised helix bars 32 can have a triangular cross-section. In addition, as shown in FIG. 5, the raised pumping features 32 can get taller as the raised pumping features 32 extend further away from a distal end of the axial lip seal 30.

Figure 6:
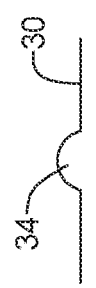
FIG. 6 is a detailed cross section of an exemplary vent of the contacting axial lip.

With reference to FIGS. 3 and 6, a distal end edge 30a of the axial seal lip 30 can also include a plurality of vent passages 34. As shown in FIG. 6, the vent passages 34 can have a curved cross section. FIG. 3 shows four vent passages, although between 2 and 8 vent passages could be used.

In an undeformed, uninstalled state, the axial seal lip 30 can extend at an angle of between 30 and 70 degrees from an axis of rotation of the shaft 16. In the embodiment shown in FIG. 1, the axial seal lip 30 extends at an angle of approximately 50 degrees from an axis of rotation of the shaft 16. In the assembled condition, the axial seal lip 30 is deformed to the extent that the raised pumping features such as helix bars 32 lay down against the radially extending surface 18b of the slinger 18.

Axial contacting lips are standard practice for exclusion in applications without endplay. While the primary main sealing lip uses a helix to help pump fluid into the oil system, using a similar feature on the contacting axial lips according to the principles of the present disclosure pump/push particles out of the seal to extend seal life. The pumping ability of a standard helix, when in contact with an adjacent surface, can move material present at the interface away from the seal exclusion interface. The axial lip pressure applied to the exclusion slinger under normal operating conditions with a pumping feature is designed to push material away from the interface and assist with the existing seal contaminant exclusion features. A contacting axial lip design with the ability to push material out of the seal versus material being trapped within the seal, eventually entering the shaft/seal interface, is designed to extend the seal life and performance beyond current designs.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive-line seal system, comprising:
   a housing having a bore therein;
   a shaft rotatably received in the bore;
   a slinger mounted to the shaft and having a radially outwardly extending surface;
   an annular retainer mounted within the bore in the housing;
   an annular seal body molded to the retainer and including a main seal lip and a dust lip extending from an inner end of the annular retainer, the annular seal body further including an axial seal lip which engages the radially extending surface of the slinger, wherein the axial seal lip includes a plurality of raised pumping features that engage the radially extending surface of the slinger, the raised pumping features having a distal end having a height that is stepped up from a distal edge of the axial seal lip, wherein the distal edge of the axial seal lip includes a plurality of vent passages.

2. The drive-line seal system according to claim 1, wherein the plurality of raised pumping features include between 4 and 12 raised helix bars.

3. The drive-line seal system according to claim 1, wherein the plurality of raised pumping features are triangular in cross section.

4. The drive-line seal system according to claim 1, wherein the main seal lip and the dust lip engage the shaft.

5. The drive-line seal system according to claim 1, wherein the raised pumping features extend to the distal edge of the axial seal lip.

6. The drive-line seal system according to claim 1, wherein the main seal lip is on an interior side of the seal system and the axial seal lip is on an exterior side of the seal system.

\* \* \* \* \*